United States Patent
Gregerson et al.

[11] Patent Number: 5,818,025
[45] Date of Patent: Oct. 6, 1998

[54] SELECTIVE PATTERN SCANNER

[75] Inventors: David L. Gregerson, Duluth; Edward G. Rantze, Lawrenceville, both of Ga.

[73] Assignee: NCR Corporation, Dayton, Ohio

[21] Appl. No.: 910,704

[22] Filed: Aug. 13, 1997

[51] Int. Cl.$^6$ .................................................. G06K 7/10
[52] U.S. Cl. ........................................................ 235/467
[58] Field of Search ................................. 235/467, 455, 235/470, 454, 456, 462; 359/198, 217, 218, 219

[56] References Cited

U.S. PATENT DOCUMENTS

| | | | |
|---|---|---|---|
| 4,692,603 | 9/1987 | Brass et al. | 235/467 |
| 5,208,456 | 5/1993 | Appel et al. | 250/236 |
| 5,252,816 | 10/1993 | Onimaru et al. | 235/467 |
| 5,288,983 | 2/1994 | Nakazawa | 235/462 |
| 5,294,784 | 3/1994 | Tooley et al. | 235/467 |
| 5,378,883 | 1/1995 | Batterman et al. | 23/472 |
| 5,504,316 | 4/1996 | Bridgelalls | 235/462 |
| 5,528,022 | 6/1996 | Nakazawa | 235/455 |
| 5,612,544 | 3/1997 | Busch | 235/462 |
| 5,646,766 | 7/1997 | Conemac | 359/204 |

*Primary Examiner*—Thien Minh Le
*Attorney, Agent, or Firm*—Francis L. Conte

[57] ABSTRACT

A barcode scanner includes a spinner disposed in optical alignment with a light emitter for reflecting a light beam from a plurality of mirror facets. A motor is joined to the spinner for rotating the spinner to align in turn the spinner facets with the light emitter. A plurality of pattern mirrors are optically aligned with the spinner for reflecting the light beam from the spinner facets as a plurality of scan lines. A controller is operatively joined to the light emitter for turning the light emitter on during a first mode of operation for effecting all of the plurality of scan lines in sequence. A control tab is joined to the spinner for rotation therewith. A sensor is spaced adjacent to the spinner for detecting proximity of the control tab, and is operatively joined to the light emitter for periodically turning on the light emitter during a second mode of operation for effecting less than all the scan lines corresponding with detection of the control tab adjacent to the sensor.

20 Claims, 4 Drawing Sheets

SELECTIVE PATTERN SCANNER

BACKGROUND OF THE INVENTION

The present invention relates generally to barcode scanners, and, more specifically, to pattern scanners.

A typical one-dimensional barcode includes a series of dark bars having white spaces therebetween of varying width for encoding therein certain information. Barcodes are commonly found in the retail business for identifying retail products and prices thereof in accordance with the Universal Product Code (UPC) convention, for example.

Barcode scanners are available in various configurations including portable handheld and stationary models. A typical barcode scanner includes a rotating spinner having a plurality of mirror facets which receive a light beam, such as a laser beam from a suitable laser. The laser beam is initially reflected off the spinner to next reflect off a plurality of pattern mirrors in sequence for generating a plurality of scan lines per cycle or revolution of the spinner. For example, the spinner may have three facets, cooperating with seven pattern mirrors for a total of twenty-one scan lines.

The angular orientations of the spinner facets and pattern mirrors are specifically configured for effecting a desired scan line pattern, with the scan lines typically intersecting each other at various angles. In this way, the likelihood of achieving an acceptable scan of the barcode is increased irrespective of the position of the barcode relative to the scanner. An accurate scan merely requires the traverse of a single scan line across the row of barcode lines which reflect light back through the scanner in a collection path therethrough, which is then conventionally decoded for the specific barcode being read.

In some applications, barcodes may be found closely together such as in a barcode menu of several different barcodes found on a common article. If the scanning pattern is too large in area and covers two or more barcodes, then the ability to detect a single one of the barcodes is compromised. Although a single-line barcode scanner may be used in this example, the benefits attributable to a pattern scanner are desired for most applications.

The prior art includes one type of pattern scanner which is selectively operable in its full-pattern mode of operation, and in selected plural-line modes of operation. However, relatively complex electronic circuitry is used in this example for detecting selected scan lines in operating with less than the full pattern. In essence, a trigger is used to selectively activate a laser source for selecting the desired scan lines. The associated complex circuitry correspondingly increases the complexity and cost of the barcode scanner which are undesirable. The additional electronics required inherently creates electronic time delays in implementation, which adversely affects the accuracy of the selected scan lines. The additional electronic components introduce additional component tolerances which further adversely affect the time response, accuracy, and repeatability of effecting the desired scan lines. Further complicating the design is the inherent tolerance of operation of the spinner motor which operates at a generally constant rotational speed with a small percentage variation which also adversely affects the accuracy of the desired scan lines.

Accordingly, it is desired to effect a selective pattern barcode scanner operable in both full-pattern mode and less than full pattern mode, in a line-mode for example, with precise and repeatable selected scan lines obtained in relatively simple electronic circuitry without significant adverse affect from component tolerances.

SUMMARY OF THE INVENTION

A barcode scanner includes a spinner disposed in optical alignment with a light emitter for reflecting a light beam from a plurality of mirror facets. A motor is joined to the spinner for rotating the spinner to align in turn the spinner facets with the light emitter. A plurality of pattern mirrors are optically aligned with the spinner for reflecting the light beam from the spinner facets as a plurality of scan lines. A controller is operatively joined to the light emitter for turning the light emitter on during a first mode of operation for effecting all of the plurality of scan lines in sequence. A control tab is joined to the spinner for rotation therewith. A sensor is spaced adjacent to the spinner for detecting proximity of the control tab, and is operatively joined to the light emitter for periodically turning on the light emitter during a second mode of operation for effecting less than all the scan lines corresponding with detection of the control tab adjacent to the sensor.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
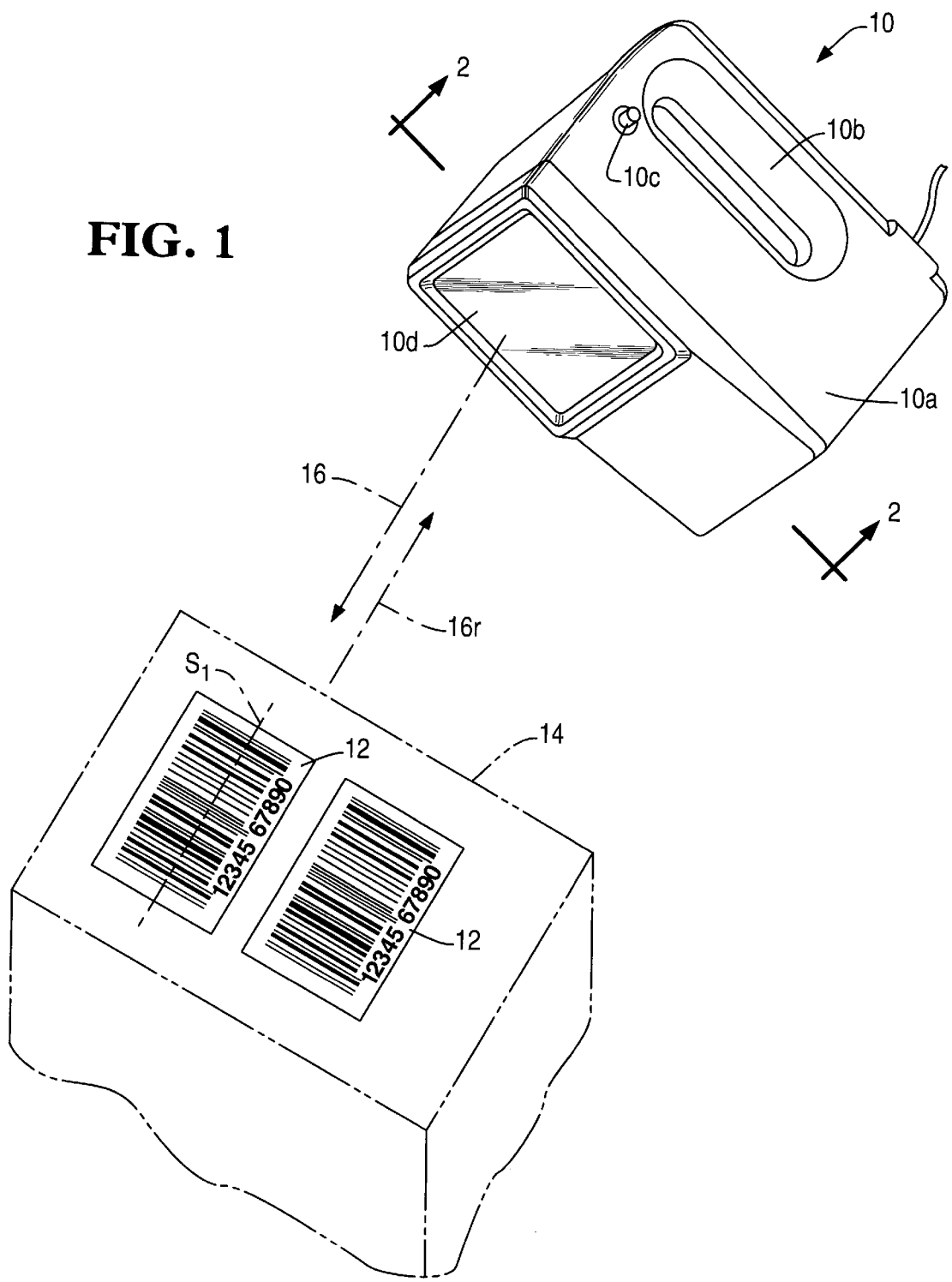
FIG. 1 is an isometric view of an exemplary portable barcode scanner in accordance with one embodiment of the present invention for selectively generating full-pattern or less than full pattern scan lines for decoding one or more barcodes.

Illustrated in FIG. 1 is a selective pattern barcode scanner 10 in accordance with an exemplary embodiment of the present invention. In this configuration, the scanner 10 includes a housing 10a in which the operating components thereof are housed, and an integral handle 10b which allows mobility of the handheld pickup scanner 10 so that it may be manually aimed at a conventional barcode 12 on an article or package 14. The barcode 12 may take any conventional form, including the one-dimensional barcode illustrated, having a series of parallel dark bars and white spaces therebetween of varying width by which data is encoded, such as in the known Universal Product Code (UPC) convention, for example.

The pickup scanner 10 illustrated in FIG. 1 has a suitable electrical cord for providing power thereto and is configured for broadcasting a light beam in the form of a conventional laser beam 16 in one or more scan lines such as a horizontal scan line $S_1$ for laterally traversing the barcodes 12 for conventional reading and decoding thereof.

In accordance with the present invention, the scanner 10 is configured for selectively broadcasting a single one or more scan lines up to a full complement of scan lines in a specific pattern for providing versatility in reading individual or menu grouping of barcodes 12. In FIG. 1, the two barcodes 12 illustrated are disposed closely together in a menu format in a relatively small area which falls within the broadcasting range of the full scan pattern. Accordingly, broadcasting the full scan pattern over the two barcodes 12 would fail to discriminate between the two barcodes which are being read simultaneously.

The scanner 10 therefore includes a suitable switch 10c, in the form of a push button for example, which may be manually depressed for temporarily changing the mode operation of the scanner 10 from a first mode broadcasting the full scan pattern to a second mode for broadcasting a selected one or more of individual scan lines for reading individual barcodes 12.

The exemplary scanner 10 illustrated in FIG. 1 may take any conventional form, and is modified in accordance with the present invention to provide scan line selectivity in a simple manner. For example, the scanner 10 may be based on a conventional pickup scanner Model No. 7890 commercially available form the NCR Corporation, which has a generally rectangular housing 10a in which the operating components are mounted, with the laser beam 16 being broadcast through a rectangular window 10d therein.

Figure 2:
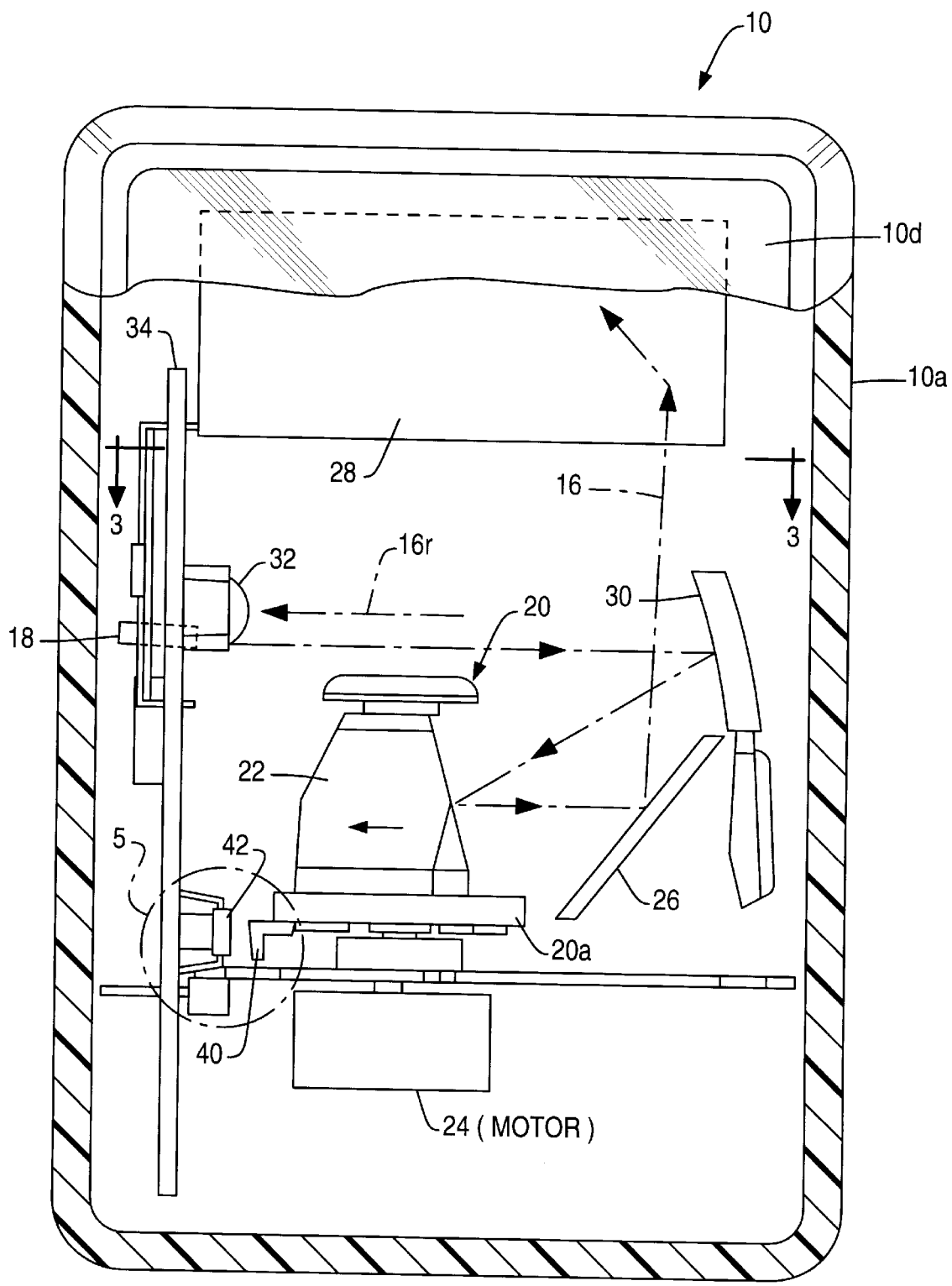
FIG. 2 is an elevational, partly sectional view of the barcode scanner illustrated in FIG. 1 and taken along line 2—2.
Figure 3:
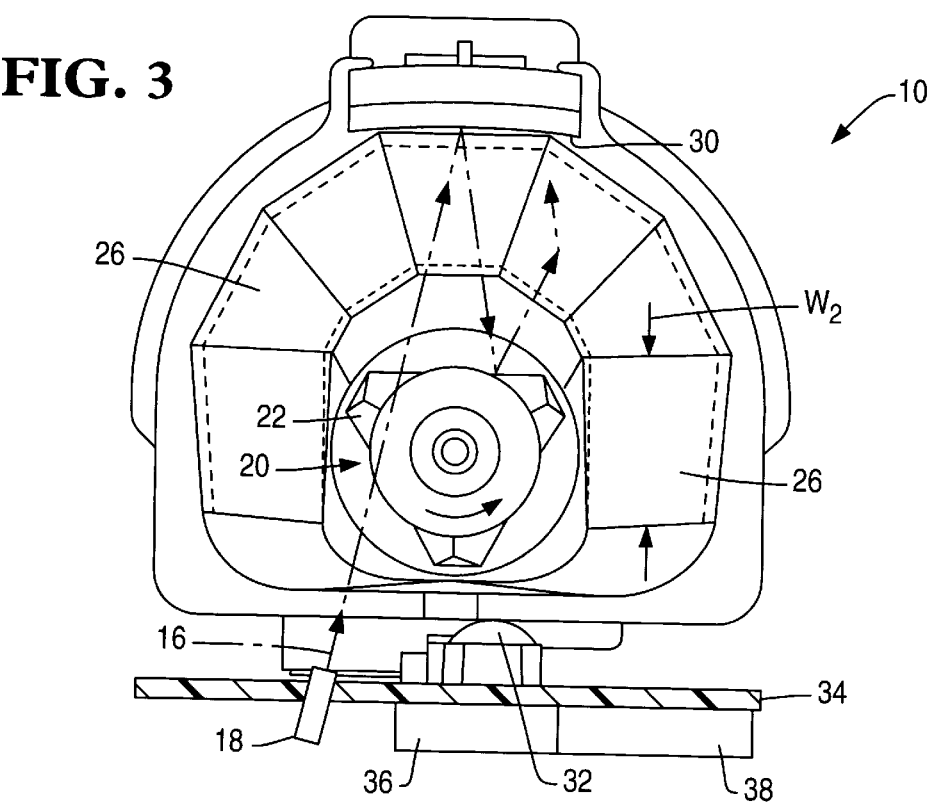
FIG. 3 is a plan view of a portion of the scanner illustrated in FIG. 2 and taken along line 3—3.

The scanner 10 is illustrated in more particularity in FIGS. 2 and 3 and includes a light emitter 18 in the form of a conventional laser for emitting a laser light beam 16 therefrom. A conventional spinner 20 is disposed in optical alignment with the laser 18, and includes a plurality of mirror facets 22 suitably mounted thereto for reflecting the laser beam 16 in a corresponding plurality of beam segments. In the exemplary embodiment illustrated in FIGS. 2 and 3, three facets 22 in generally triangular form are equally spaced around the spinner 20 at suitable inclinations upwardly from an annular base 20a of the spinner 20. The three facets 22 preferably have different angles of inclination for differently reflecting the laser beam 16 in three different paths.

A suitable motor 24 is operatively joined to the spinner 20 for spinning or rotating the spinner 20 to optically align in turn the spinner facets 22 with the laser 18. The motor 24 is preferably operated at a constant rotational velocity subject to typical manufacturing tolerances of up to a few percent, plus or minus.

A plurality of conventional pattern mirrors 26 are optically aligned with the spinner 20 for reflecting the laser beam 16 from the spinner facets 22 as a plurality of respective discrete scan lines. In the exemplary embodiment illustrated in FIG. 3, there are seven pattern mirrors 26 which adjoin each other in a generally semicircular arc around one side of the spinner 20 for reflecting from the spinner facets 22 the laser beam 16. The configuration and orientation of each of the spinner facets 22 and pattern mirrors 26 is conventionally chosen to produce a desired full pattern of scan lines of the laser beam 16 per revolution or cycle as shown in an exemplary embodiment in FIG. 4. The three spinner facets 22 trace the laser beam 16 along different paths on the seven pattern mirrors 26 for producing a total of twenty-one scan lines which are corresponding segments of the laser beam 16 broadcast per revolution of the spinner 20.

The spinner 20 and pattern mirrors 26 are arranged in a compact configuration as illustrated in FIG. 2, and a flat folding mirror 28 is suitably aligned with the window 10d for broadcasting the full scan pattern therethrough during operation. The broadcast laser beam 16 is directed toward the barcode 12 illustrated in FIG. 1 for scanning thereacross to obtain reflected light in a return beam 16r for being decoded in the scanner 10. As shown in FIGS. 2 and 3, the return beam 16r returns along the same optical path as the broadcast beam 16 for being conventionally detected in the scanner 10.

In this regard, the scanner 10 also includes a conventional collection mirror 30 disposed in the optical path between the laser 18 and the spinner 20 for collecting or focusing the return beam 16r from the spinner facets 22 onto a conventional light sensor or detector 32 mounted on a conventional printed circuit (PC) board 34. The collection mirror 30, or a suitable portion thereof, is also used for folding the light path in the forward direction for first receiving the laser beam 16 from the laser 18 and directing it toward the spinner facets 22 in the broadcasting forward optical path.

As shown in FIG. 3, a conventional system controller 36 is mounted on the PC board 34 and is operatively joined to the laser 18 and motor 24 for controlling operation thereof. The controller 36 includes suitable electronic circuitry for signaling on the laser 18 during a first mode of operation for creating or effecting all the plurality of scan lines shown in FIG. 4 for the full or entire complement thereof in sequence per revolution or cycle. In this pattern mode of operation, the laser 18 is operated continuously so that the laser beam 16 reflects off each of the different spinner facets 22 and across the respective pattern mirrors 26 for correspondingly creating the twenty-one scan lines therefrom per revolution.

After reflecting from a barcode, the return beam 16r travels through the scanner 10 to the light sensor 32 which is operatively joined to a conventional decoder 38 also mounted to the PC board 34.

Figure 4:
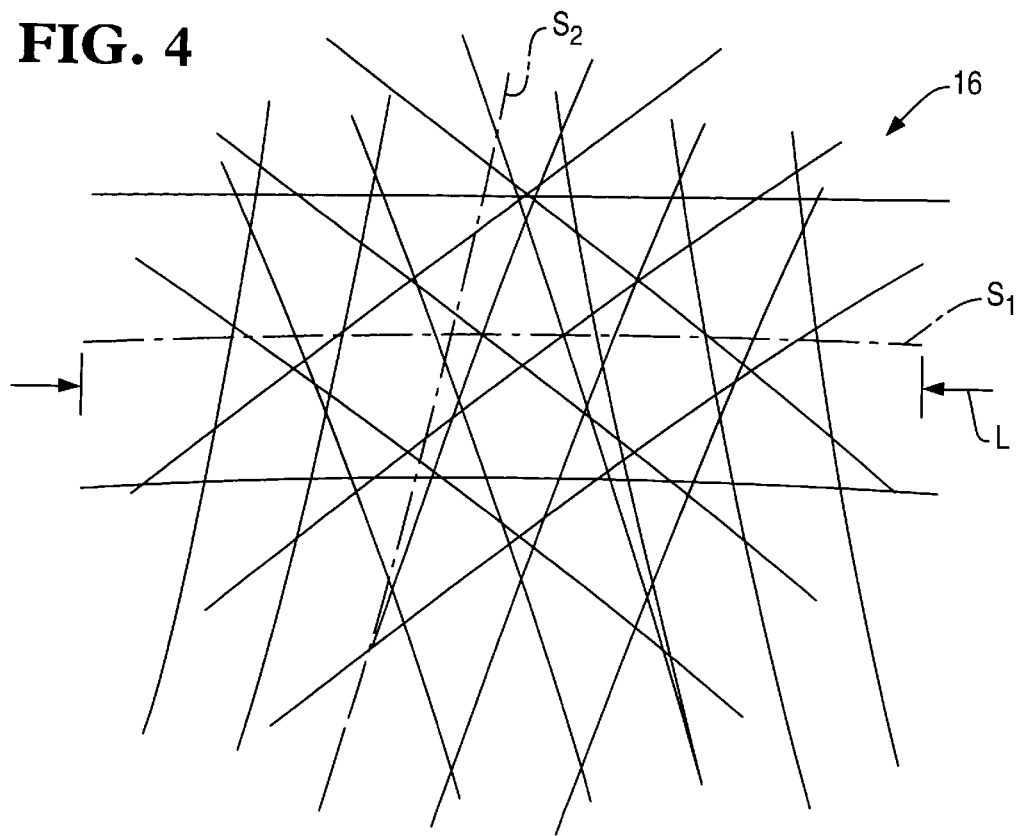
FIG. 4 is a plan view of a plurality of exemplary scan lines effected by the barcode scanner of FIGS. 1–3.

The scanner 10 as described above is conventional in configuration and operation for producing the full twenty-one scan line pattern as shown in FIG. 4. However, the full pattern is undesirable when reading barcodes in menu format as shown in FIG. 1 in which adjacent barcodes may be simultaneously read without discrimination therebetween. In accordance with the present invention, the scanner 10 is suitably modified for operation in a second, or line, mode of operation for effecting less than all the scan lines per revolution to provide a part-pattern selected to cover an individual barcode 12 even when adjacent barcodes are present in the menu format.

Figure 5:
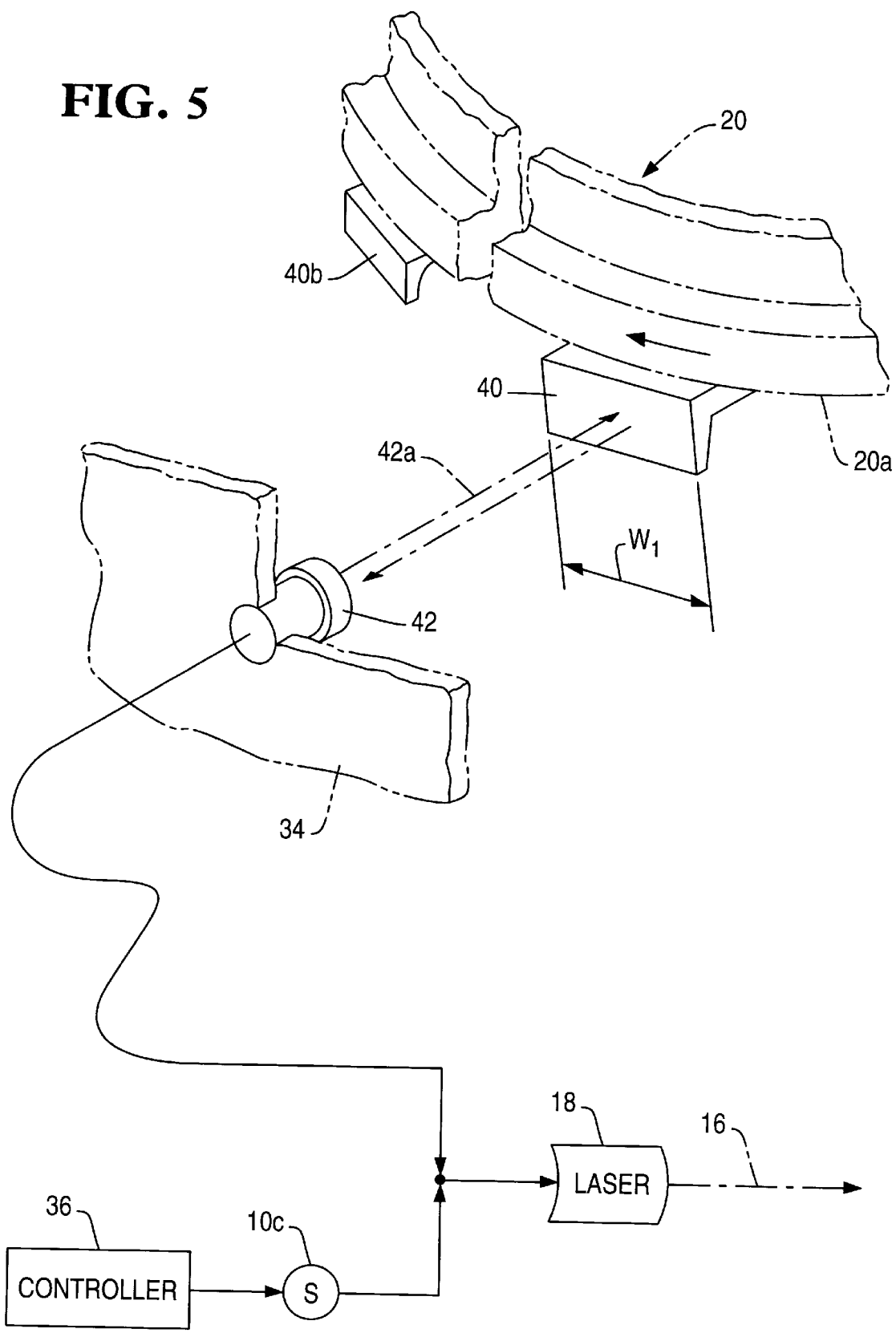
FIG. 5 is a schematic, partly sectional view of a control tab and sensor found in the scanner illustrated in FIG. 2 within the circle labeled 5 for effecting selective pattern operation.

More specifically, and referring to FIGS. 2 and 5, the scanner 10 preferably includes a light reflective control tab 40 fixedly joined to the spinner 20, at a base 20a thereof for example, for rotation therewith during operation. A suitable control sensor 42 is fixedly mounted to the PC board 34 and is spaced adjacent to the spinner 20 at its base for detecting the presence or proximity of the control tab 40 as the spinner rotates during operation.

The control sensor 42 is operatively joined directly to the laser 18, in a circuit which is parallel with the controller 36 for periodically turning on and off the laser 18 during the second mode of operation corresponding with detection of the control tab 40 adjacent to the sensor 42. The selection switch 10c may be suitably joined to the controller 36 for turning off the control signal therefrom to the laser 18 during the second mode of operation, with the laser 18 being instead controlled by the control sensor 42 itself.

The laser 18 typically includes its own internal control circuitry which merely requires a suitable on and off signal thereto for turning on and off the laser beam 16. The selection switch 10c may be suitably joined between the controller 36 and the laser 18 for selecting between the first and second modes of operation, with the laser 18 being controlled by the controller 36 in the first mode of operation for full pattern generation, and instead by the control sensor 42 during the second mode of operation for providing part-pattern operation.

The control tab 40 illustrated in FIG. 5 is disposed on the spinner 20 at a predetermined circumferential position thereon to correspond with a selected one or more of the full pattern twenty-one scan lines of the laser beam 16 per revolution. The control tab 40 preferably corresponds solely with a single, selected one of the seven pattern mirrors 26 for effecting a corresponding selected scan line therefrom, such as the horizontal first selected scan line $S_1$ illustrated in dashed line in FIG. 4. The control tab 40 illustrated in FIG. 5 has a width $W_1$ measured along the circumference of the spinner 20, which corresponds with a width $W_2$ as illustrated in FIG. 3, of the selected pattern mirror 26 along which the laser beam 16 traces its path to effect the selected scan line $S_1$ once per revolution of the spinner 20.

As described above, in each revolution of the spinner 20 the laser beam 16 is reflected off of each of the three spinner facets 22, and in turn is reflected off each of the seven pattern mirrors 26 in sequence for creating the twenty-one scan lines illustrated in FIG. 4 in three sequential groups of seven scan lines. The control tab 40 and cooperating sensor 42 are specifically mounted so that any one or more of the twenty-one individual scan lines may be selected from the full pattern, with the remaining scan lines being turned off by correspondingly turning on and off the laser 18 in the second mode.

The circumferential position of the control tab 40 on the spinner 20 determines which of the several scan lines is selected during the second mode, and the circumferential width $W_1$ of the control tab 40 determines the corresponding on time of the laser 18 which is precisely matched to the travel of the laser beam 16 across the corresponding pattern mirror 26 for preferably generating the entire individual scan line corresponding thereto, such as the first selected scan line $S_1$ illustrated in FIG. 4.

The first selected scan line $S_1$ has a length L which corresponds both with the respective scanning width $W_2$ of its pattern mirror, and the width $W_1$ of the control tab 40 associated therewith. The control sensor 42 detects the proximity or presence of the control tab 40 once per revolution for a periodic interval corresponding precisely with the selected scan line $S_1$. The control sensor 42 in turn provides a suitable on signal directly to the laser 18 for turning the laser 18 on to produce the laser beam 16 only while the control tab 40 is within detection range of the sensor 42, after which the signal from the sensor 42 is turned off for correspondingly turning off the laser 18 during the second mode of operation.

In this way, the position and width of the control tab 40 directly control which of the several scan lines is turned on in the second mode, and for how long to correspond with the full length of the selected scan line. And, for the remaining portion of rotation of the spinner 20 in each revolution, the laser 18 is turned off so that the remaining scan lines are not produced in the second mode.

A significant advantage of the present invention is the simplicity of the control tab 40 and cooperating sensor 42 directly joined to the laser 18 independently of the system controller 36 which reduces the overall complexity of the electronic system, and correspondingly minimizes electronic time delay in effecting the selected scan line. The manufacture of each scanner 10 inherently includes operational variation in the various components thereof which affect the performance during operation. The controller 36 itself has inherent dynamic response variations from scanner-to-scanner, and the spinner motor 24 also has a variation or tolerance in its rotational speed from scanner-to-scanner. Although the spinner motor 24 is normally operated at a constant rotational speed, inherent manufacturing tolerances result in speed variation of a few percent plus or minus during operation which may vary from scanner-to-scanner.

In the line-selection second mode of operation of the scanner 10, suitable precision is required to extract only the desired scan line from the full pattern for effective operation. Although twenty-one scan lines are illustrated in FIG. 4, those twenty-one scan lines are created from segments of the continuous laser beam 16 per revolution by the cooperating spinner facets 22 and pattern mirrors 26. The individual scan lines must therefore be precisely intercepted as the spinner 20 rotates during operation for obtaining the desired individual scan lines selected. For example, if the laser beam 16 is turned on for a part-revolution duration which bridges either two of the spinner facets 22 or two of the pattern mirrors 26, the resulting scan lines will be incomplete portions of the corresponding sequential scan lines of the full pattern illustrated in FIG. 4. Precision of operation is therefore critical in selecting only the desired scan line, and preferably with its entire length as produced by tracing along the corresponding pattern mirror 26.

Precision in effecting the selected scan line is readily obtained by precisely mounting the control tab 40 and precisely controlling its circumferential width $W_1$. In this way, the control tabs 40 may be manufactured within suitable tolerances and then mounted to their respective spinners 20 during the manufacturing process to provide primarily a mechanical control for periodically turning on the laser 18 during the second mode of operation. The control sensor 42 itself merely detects the presence or absence of the control tab 40 and responds substantially instantaneously thereto for correspondingly turning the laser 18 on and off as required in the second mode.

Accordingly, substantially no electronic time delay is created between the control tab 40 and the laser 18, with the control sensor 42 being operated independently of the system controller 36. Neither variations in operation of the controller 36 or spinner motor 24 from scanner-to-scanner affects performance of the line selectivity controlled by the tab 40 and sensor 42. Line selectivity is therefore effected in a repeatable and precise manner in the individual scanner 10 irrespective of operation of the controller 36 and spinner motor 24, and it is precisely repeatable from scanner-to-scanner as well.

In the preferred embodiment illustrated in FIG. 5, the control tab 40 is preferably reflective and has a reflective surface facing the sensor 42. The sensor 42 is preferably a conventional photo-emitter-detector effective for emitting an infrared (IR) light signal 42a towards the spinner 20 in optical alignment with the rotating control tab 40, once per revolution, for reflection therefrom and detection by the sensor 42. As the control tab 40 rotates with the spinner 20, it periodically reflects the light signal 42a emitted from the sensor 42 back to the sensor 42 which therefore detects the presence of the control tab 40 adjacent to the sensor 42.

The control tab 40 has a width corresponding with only a few degrees of the entire 360° circumference of the spinner 20 for turning on the laser 18 periodically to correspond with the selected scan line desired. When the sensor 42 detects the control tab 40, it correspondingly signals the laser 18 on for generating the laser beam 16 periodically and solely during detection of the control tab 40. When the control tab 40 is outside the range of the sensor 42, the signal from the sensor 42 to the laser 18 turns the laser off and prevents generation of the remaining scan lines during the second mode of operation.

If desired, a plurality of the control tabs, such as tabs 40 and 40b, may be used and circumferentially spaced apart from each other on the spinner 20 as shown in FIG. 5. The two exemplary tabs 40, 40b are mounted to the spinner base 20a in the same horizontal plane for being optically aligned with the common sensor 42. Each control tab 40, 40b is positioned on the spinner 20 and has a corresponding width $W_1$ for effecting corresponding selected ones of the scan lines illustrated in FIG. 4 during the second mode.

For example, the first tab 40 is positioned and has a width for effecting the first selected scan line $S_1$ illustrated in FIG. 4, with the second control tab 40b being positioned on the spinner 20 and having a suitable width for effecting a second selected scan line $S_2$ which intersects the first scan line $S_1$ in a cross-hair pattern if desired. The first control tab 40 is associated with one of the pattern mirrors 26, and the second control tab 40b is associated with a different one of the pattern mirrors 26 to effect a corresponding plurality of the selected scan lines. In this way, two or more of the scan lines from the full pattern illustrated in FIG. 4 may be selected for use in the second mode of operation by providing corresponding ones of the control tabs 40 therefor.

Using the reflective tab 40 and photo-detector-emitter 42 increases precision and repeatability in manufacturing, and allows the laser 18 to be pulsed directly by the reflective signal with minimal electronic propagation delay. If a longer laser pulse is desired, a wider reflective tab 40 may be used. And, the power of the laser 18 may be suitably increased during the line or pulse-mode to increase the visibility of the selected scan line if desired.

The control tab 40 and sensor 42 may take other suitable forms which detect the angular position of the spinner 20 over a desired part-revolution duration for directly activating the laser 18 on and off in a pulse mode for creating only selected ones of the several scan lines from the full pattern illustrated in FIG. 4. In this way, the full pattern may be used in the first mode of operation, and only a part-pattern or single scan line may be used in the second mode when desired.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims.

We claim:

1. A barcode scanner comprising:
   a light emitter for emitting a light beam;
   a spinner disposed in optical alignment with said light emitter, and having a plurality of mirror facets for reflecting said light beam;
   a motor operatively joined to said spinner for rotating said spinner to optically align in turn said spinner facets with said light emitter;
   a plurality of pattern mirrors optically aligned with said spinner for reflecting said light beam from said spinner facets as a plurality of scan lines;
   a controller operatively joined to said light emitter for turning said light emitter on during a first mode of operation for effecting all said plurality of scan lines in sequence;
   a control tab joined to said spinner for rotation therewith; and
   a control sensor spaced adjacent to said spinner for detecting proximity of said control tab, and operatively joined to said light emitter for periodically turning on said light emitter during a second mode of operation for effecting less than all said scan lines corresponding with detection of said control tab adjacent to said sensor.

2. A scanner according to claim 1 wherein said control tab is disposed on said spinner to correspond with a selected one of said scan lines.

3. A scanner according to claim 2 wherein said control tab corresponds solely with a selected one of said pattern mirrors for effecting a corresponding selected scan line therefrom.

4. A scanner according to claim 3 wherein said control tab has a width corresponding with a width of said selected pattern mirror to effect a length of said selected scan line once per revolution of said spinner.

5. A scanner according to claim 4 further comprising a selection switch operatively joined to said controller for selecting between said first and second modes of operation, and for controlling activation of said light emitter by either said controller or said sensor, respectively.

6. A scanner according to claim 5 wherein:
   said control tab is reflective;
   said sensor is a photo-emitter-detector for emitting a light signal toward said spinner in optical alignment with said control tab for reflection therefrom and detection by said sensor; and
   said sensor is operatively joined to said light emitter for generating said light beam periodically during detection of said control tab by said photo-emitter-detector.

7. A scanner according to claim 6 further comprising a plurality of said control tabs spaced apart on said spinner, and corresponding with different selected ones of said pattern mirrors to effect a corresponding plurality of said selected scan lines.

8. A scanner according to claim 6 wherein said sensor is directly joined to said light emitter, independently of said controller, for minimizing electronic time delay in effecting said selected scan line.

9. A scanner according to claim 6 wherein:
   said spinner motor has a variation in rotational speed;
   said control tab is fixedly joined to said spinner; and
   said sensor is directly joined to said light emitter, independently of said controller, for effecting said selected scan line independently of said motor speed variation.

10. A scanner according to claim 6 wherein said light emitter is a laser configured to emit a laser beam.

11. A scanner according to claim 1 wherein said control sensor is operatively joined to said light emitter in parallel with said controller.

12. A scanner according to claim 1 further comprising means for selectively terminating control of said light emitter by said controller during said second mode for allowing control of said light emitter instead by said control sensor during said second mode.

13. A sensor according to claim 1 wherein said controller is operatively joined also to said motor for controlling operation thereof.

14. A scanner according to claim 1 wherein said light emitter includes internal control circuitry operatively joined to said controller and effective for receiving on and off signals separately from said controller and said control sensor.

15. A scanner according to claim 1 wherein said control tab is joined to said spinner with a circumferential position corresponding with a selected one of said scan lines.

16. A scanner according to claim 1 wherein said control tab has a circumferential width corresponding to periodic on-time of said light emitter during said second mode.

17. A scanner according to claim 16 wherein said tab width corresponds with a scanning width of said light beam across a selected one of said pattern mirrors.

18. A scanner according to claim 1 wherein said control tab is joined to said spinner with a circumferential position and width to determine which of said scan lines is turned on in said second mode, and for how long.

19. A scanner according to claim 1 wherein:

said control tab is reflective;

said sensor is a photo-emitter-detector for emitting a light signal toward said spinner in optical alignment with said control tab for reflection therefrom and detection by said sensor; and said sensor is operatively joined to said light emitter for generating said light beam periodically during detection of said control tab by said photo-emitter-detector.

20. A scanner according to claim 19 further comprising a plurality of said control tabs spaced apart on said spinner, and corresponding with different selected ones of said pattern mirrors to effect a corresponding plurality of said selected scan lines.

* * * * *